(12) United States Patent
Choi (10) Patent No.: US 8,411,964 B2
(45) Date of Patent: Apr. 2, 2013

(54) METHOD AND APPARATUS FOR ANALYZING NUDITY OF IMAGE USING BODY PART DETECTION MODEL, AND METHOD AND APPARATUS FOR MANAGING IMAGE DATABASE BASED ON NUDITY AND BODY PARTS

(75) Inventor: Byeong Cheol Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 261 days.

(21) Appl. No.: 12/962,099

(22) Filed: Dec. 7, 2010

(65) Prior Publication Data

US 2011/0135204 A1 Jun. 9, 2011

(30) Foreign Application Priority Data

Dec. 7, 2009 (KR) .................... 10-2009-0120241

(51) Int. Cl.
*G06K 9/00* (2006.01)
*G06K 9/46* (2006.01)
(52) U.S. Cl. ................ 382/195; 382/181; 382/162
(58) Field of Classification Search .............. None
See application file for complete search history.

(56) References Cited

U.S. PATENT DOCUMENTS

| | | | |
|---|---|---|---|
| 6,904,168 B1 * | 6/2005 | Steinberg et al. ............ | 382/165 |
| 6,973,201 B1 | 12/2005 | Colmenarez et al. | |
| 2005/0160258 A1 * | 7/2005 | O'Shea et al. .............. | 713/154 |
| 2008/0112622 A1 | 5/2008 | Kwak et al. | |
| 2008/0159627 A1 | 7/2008 | Sengamedu | |
| 2009/0123064 A1 * | 5/2009 | Gibbs ........................ | 382/165 |
| 2010/0111370 A1 * | 5/2010 | Black et al. ................ | 382/111 |

FOREIGN PATENT DOCUMENTS

| | | |
|---|---|---|
| JP | 2008-185480 | 8/2008 |
| KR | 1020050114817 | 12/2005 |
| KR | 1020080043080 | 5/2008 |
| KR | 1020100094045 | 8/2010 |

OTHER PUBLICATIONS

Ruiz-del-Solar, J. et al. "Characterizing objectionable image content (pornography and nude images) of specific Web segments: Chile as a case study". Third Latin American Web Congress, 2005. LA-WEB2005.*
KM Liang, SD Scott, M Waqas "Detecting pornographic images", Proc. Asian Conf. Computer Vision ACCV 2004.*
Yuan Xu et al. "Region-based Pornographic Image Detection", IEEE 7th Workshop on Multimedia Signal Processing, 2005.*
Xuanjing Shen et al. "The Filtering of Internet Images Based on Detecting Erotogenic-part", Natural Computation, ICNC 2007.*
Fleck, Margaret M. et al., "Finding Naked People," Proceedings of the 4th European Conference on Computer Vision, ECCV '96, vol. II, pp. 592-602 (1996).

* cited by examiner

*Primary Examiner* — Li Liu
(74) *Attorney, Agent, or Firm* — Nelson Mullins Riley & Scarborough LLP; EuiHoon Lee, Esq.

(57) ABSTRACT

A method for analyzing nudity of an image using a body part detection model includes: extracting a skin blob from an image; calculating a first probability value, which indicates a probability of determination on harmfulness of at least one of the image and the skin blob, using a harmfulness detection model; classifying the skin blob as a specific body part using a body part detection model, and calculating a second probability value which indicates a probability of certainty of said classifying; and rating nudity of the image based on the first probability value and the second probability value.

13 Claims, 6 Drawing Sheets

METHOD AND APPARATUS FOR ANALYZING NUDITY OF IMAGE USING BODY PART DETECTION MODEL, AND METHOD AND APPARATUS FOR MANAGING IMAGE DATABASE BASED ON NUDITY AND BODY PARTS

CROSS-REFERENCE(S) TO RELATED APPLICATION(S)

The present invention claims priority of Korean Patent Application No. 10-2009-0120241, filed on Dec. 7, 2009, which is incorporated herein by reference.

FIELD OF THE INVENTION

The present invention relates to a method and apparatus for analyzing nudity using a body part detection model, and more particularly, to a method and apparatus for analyzing nudity of multimedia contents by rating nudity of an extracted skin blob, and a method and apparatus for managing an image database based on nudity and body parts.

BACKGROUND OF THE INVENTION

As the internet is widely used, access to useful information is becoming easier but side effects concerning the distribution of an overflow of harmful information are also increasing. Easy access to harmful information by young children who need social protection and people who lack self-control has already become a social problem.

Harmful information may be classified into text, images, sound, multimedia contents, etc. Considering the share of harmful images in the harmful information and the language-independent features of image information, great importance is placed on the research of the technology for harmful image classification, identification and nudity analysis, which is an image-based harmfulness determination technology, among harmful information analysis technologies.

N. Fleck et al.'s "Finding Naked People", In European Conf. on Computer Vision, Vol. II, 1996 proposed a content-based image retrieval (CBIR) using the technology of image feature extraction and classification. Since then, there have been many researches on extraction of features contributing to a harmful image and analysis of nudity of the image using the extracted features and a learning-based identification algorithm.

Elemental technologies of the harmful image classification technology include a harmful image preprocessing technology, a harmful image feature extraction technology, a harmful image identification technology, a harmful image classification system integration technology, a harmful image classification system evaluation technology, and so on. Among these, the harmful image feature extraction technology and the harmful image identification technology have been mainly studied. These technologies are used in many areas, including internet-based multimedia services using multimedia contents, such as web portals, user created contents (UCC), peer-to-peer (P2P), web hard, etc, broadcast contents, movie contents, and so forth.

Most of the conventional technologies for harmful image classification, identification and nudity analysis employ a method using a hash or meta database. However, this method has a limitation because the method involves analysis using determination values of harmfulness or harmlessness of an entire image based on only parts of the image. Moreover, it is difficult to apply the SafeNet standards of Korea Communications Standards Commission, which are the national standards on harmful contents.

SUMMARY OF THE INVENTION

In view of the above, the present invention provides a method and apparatus for analyzing nudity of an image which meets the SafeNet standards by applying a harmfulness detection model and a body part detection model to a skin blob extracted from the image.

Further, the present invention provides a method and apparatus for analyzing nudity of an image which can improve reliability of analysis by rating nudity based on a result of classification by body parts such as a face, breasts, genitalia, combined genitalia, and the like.

Further, the present invention provides and a method and apparatus for managing an image database which enable search of an image database containing pornography or indecent images based on nudity and body parts.

In accordance with a first aspect of the present invention, there is provided a method for analyzing nudity of an image using a body part detection model, the method including:

extracting a skin blob from an image;

calculating a first probability value, which indicates a probability of determination on harmfulness of at least one of the image and the skin blob, using a harmfulness detection model;

classifying the skin blob as a specific body part using a body part detection model, and calculating a second probability value which indicates a probability of certainty of said classifying; and rating nudity of the image based on the first probability value and the second probability value.

In accordance with a second aspect of the present invention, there is provided an apparatus for analyzing nudity of an image using a body part detection model, the apparatus including:

a harmfulness detection model database for storing a harmfulness detection model of an image;

a body part detection model database for storing a body part detection model of the image;

an extraction unit for extracting a skin blob from the image;

a harmfulness determination unit for calculating a first probability value, which indicates a probability of determination on harmfulness of at least one of the image and the skin blob, using the harmfulness detection model;

a body part classification unit for classifying the skin blob as a specific body part by using the body part detection model and calculating a second probability value which indicates a probability of certainty of said classifying; and a nudity analysis unit for rating nudity of the image based on the first probability value and the second probability value.

In accordance with a third aspect of the present invention, there is provided a method for managing nudity-based and body part-based image database, the method including:

storing a harmfulness detection model of an image in a harmfulness detection model database;

storing a body part detection model of the image in a body part detection model database;

storing nudity of the image, which is rated based on harmfulness detection model and the body part detection model, in a nudity database;

storing, in a body part classification result database, a result of classification of a skin blob as a specific body part, wherein the skin blob is extracted from the image using the body part detection model;

storing, in a meta information database, meta information including a position or a size of the skin blob within the image;

searching, when a nudity-based inquiry is input, the nudity database and the meta information database to output an image corresponding to the nudity-based inquiry and its meta information as a response; and searching, when a body part-based inquiry is input, the body part classification result database and the meta information database to output an image corresponding to the body part-based inquiry and its meta information as a response.

In accordance with a fourth aspect of the present invention, there is provided an apparatus for managing nudity-based and body part-based image database, the apparatus including:

a harmfulness detection model database for storing a harmfulness detection model of an image;

a body part detection model database for storing a body part detection model of the image;

a nudity database for storing nudity of the image which is rated based on the harmfulness detection model and the body part detection model;

a body part classification result database for storing a result of classification of a skin blob as a specific body part, wherein the skin blob is extracted from the image using the body part detection model;

a meta information database for storing meta information including a position or a size of the skin blob within the image;

a nudity-based search unit for, when a nudity-based inquiry is input, searching the nudity database and the meta information database to output an image corresponding to the nudity-based inquiry and its meta information as a response; and a body part-based search unit for, when a body part-based inquiry is input, searching the body part classification result database to output an image corresponding to the body part-based inquiry and its meta information as a response.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
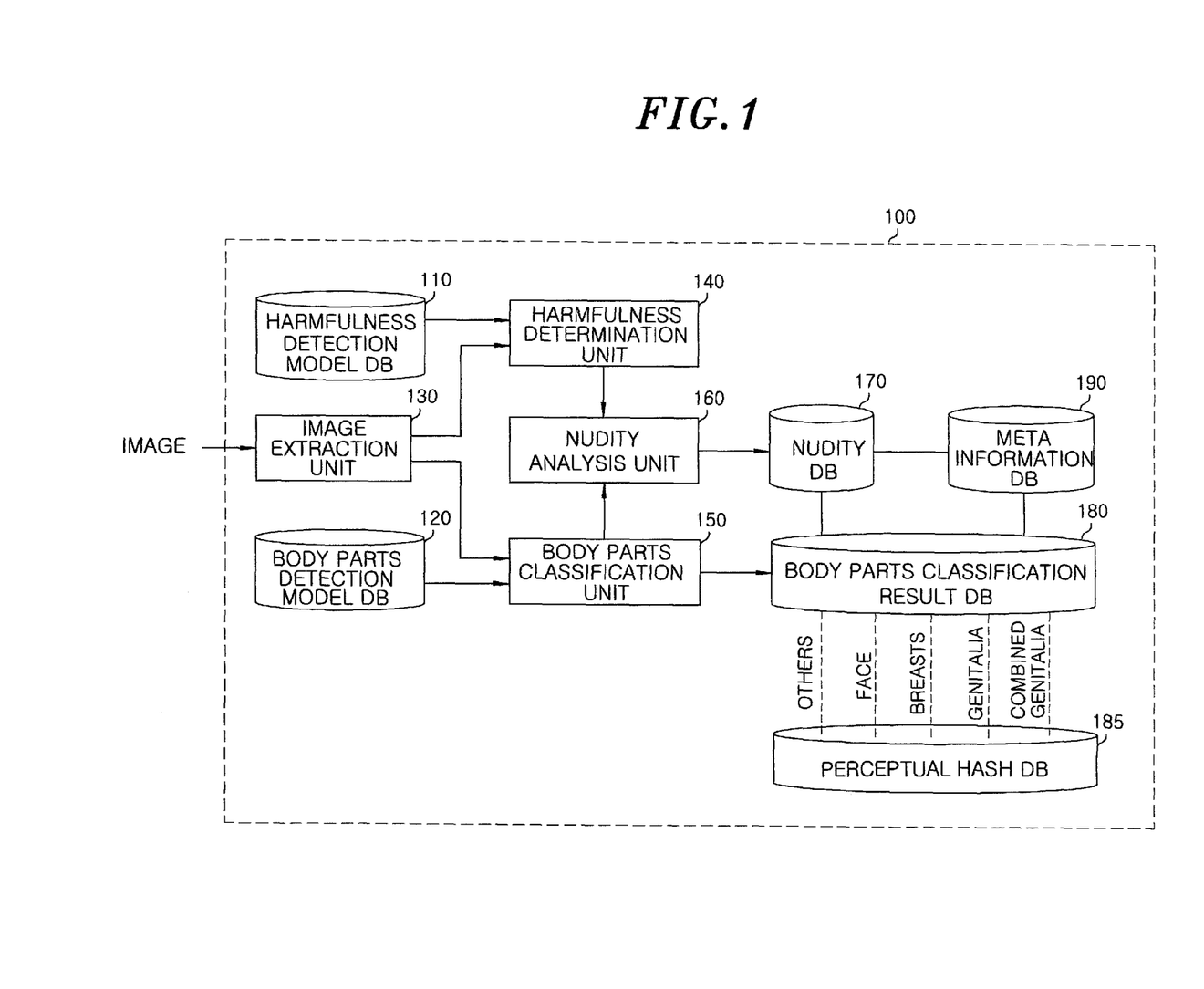
FIG. 1 is a block diagram illustrating a schematic configuration of an apparatus for analyzing nudity of an image using a body part detection model in accordance with an embodiment of the present invention.

FIG. 1 is a block diagram illustrating a schematic configuration of an apparatus for analyzing a nudity of an image using a body part detection model in accordance with an embodiment of the present invention.

Referring to FIG. 1, The apparatus 100 for analyzing nudity of an image using a body part detection model includes a harmfulness detection model database (DB) 110, a body part detection model DB 120, an image extraction unit 130, a harmfulness determination unit 140, a body part classification unit 150, a nudity analysis unit 160, a nudity DB 170, a body part classification result DB 180, a perceptual hash DB 185, and a meta information DB 190.

The harmfulness detection model DB 110 stores a harmfulness detection model, which defines a standard for determining harmfulness of the whole of an image or a skin blob extracted from the image. Harmfulness detection model may include a conventional search-based identification model, a learning-based identification model, and the like.

The body part detection model DB 120 stores a body part detection model, which defines a standard of classification by body parts. For instance, information representing, in a predetermined form, the features of images of body parts such as a face, breasts, genitalia, combined genitalia (intercourse), hands, feet, arms, legs, a waist, buttocks, and the like may be a body part detection model. The body part detection model may meet the SafeNet standards or classification standards including a face, breasts, genitalia, and combined genitalia. The body part detection model may include a conventional search-based identification model, a learning-based identification model, and the like. A skin blob extracted from an image is compared with the body part detection model to identify whether it corresponds to a specific body part or not.

The image extraction unit 130 removes noise and lighting effects from an input image, extracts a skin blob from the image by applying a skin color model or a texture energy analysis technique, and divides an image of the extracted skin blob. A detailed configuration of the image extraction unit 130 will be described later.

The harmfulness determination unit 140 compares the whole of the image or a skin blob extracted from the image by the image extraction unit 130 with harmfulness detection model in the harmfulness detection model DB 110 to determine whether or not the skin blob is a harmful image. The harmfulness determination unit 140 can calculate a first probability value which indicates a probability of determination on harmfulness of the image or the skin blob.

The body part classification unit 150 compares a skin blob extracted from the image with the body part detection model in the body part detection model DB 120 to classify the skin blob as a specific body part. The body part classification unit 150 can calculate a second probability value which indicates a probability of certainty, when a classification is made about a skin blob as a specific body part. For instance, when classifying a skin blob, if the skin blob is classified as breasts with a probability of 70% but there is still a probability of about 20% that the skin blob can be classified as a face, it is possible to derive a body part classification result that the skin blob is breasts, storing the probability value of 70% of the classification as the second probability value. In accordance with this embodiment, the body part classification unit 150 can perform classification depending on the SafeNet standards or classification standards including a face, breasts, genitalia, and combined genitalia.

The nudity analysis unit 160 analyzes nudity using harmfulness of the image determined by the harmfulness determination unit 140 and the body part classification result produced by the body part classification unit 150. An operation performed by the nudity analysis unit 160 will be described later in detail.

The nudity DB 170 stores information about nudity rated by the nudity analysis unit 160.

The body part classification result DB 180 stores the body part classification result of the skin blob produced by the body part classification unit 150 according to the predetermined SafeNet standards or the classification standards including a face, breasts, genitalia, and combined genitalia.

The perceptual hash DB 185 configures the body part classification result of the skin blob stored in the body part classification result DB 180 as a perceptual hash and stores the same. If the perceptual hash DB is constructed, the perceptual hash DB 185 can be used to enhance efficiency in body part-based search in a database management method.

The meta information DB 190 stores meta information containing a position or a size of the skin blob within the image.

Figure 2:
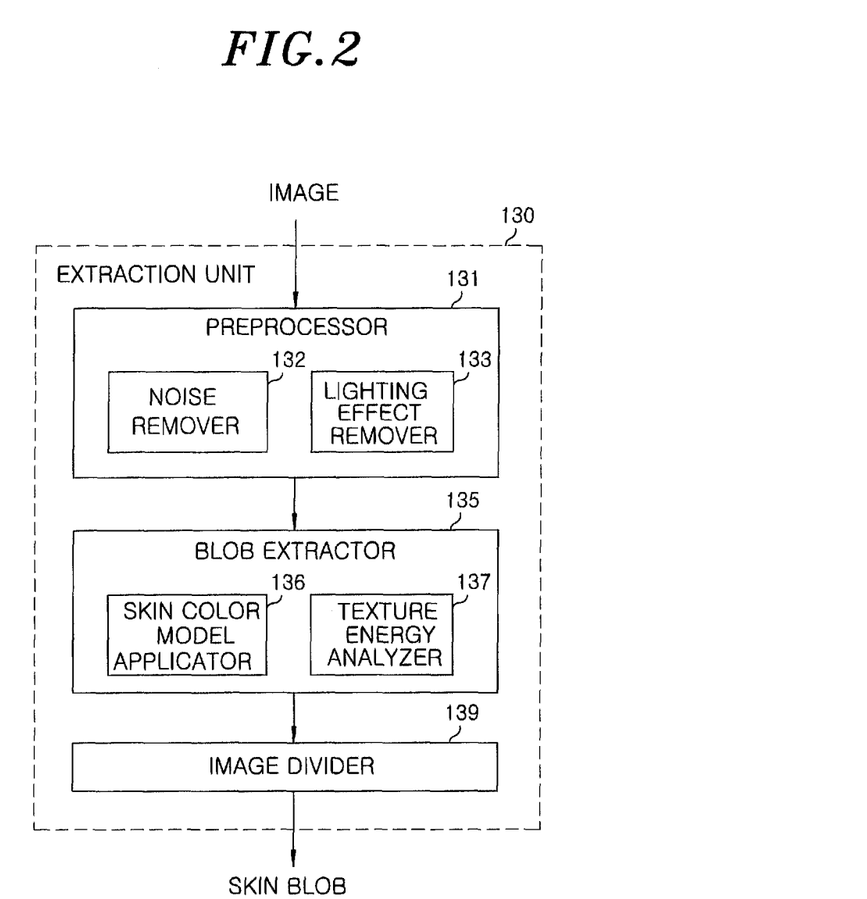
FIG. 2 is a block diagram illustrating a detailed configuration of the image extraction unit shown in FIG. 1.

FIG. 2 is a block diagram showing a detailed configuration of the image extraction unit 130 depicted in FIG. 1. The image extraction unit 130 includes a preprocessor 131 for removing noise and lighting effects of an input image, a blob extractor 135 for extracting a skin blob by applying either one or both of the skin color model and the texture energy analysis technique to the preprocessed image output from the preprocessor 131, and an image divider 139 for dividing an image of the extracted skin blob.

The preprocessor 131 includes a noise remover 132 and a lighting effect remover 133, and the blob extractor 135 includes a skin color model applicator 136 and a texture energy analyzer 137.

Figure 3:
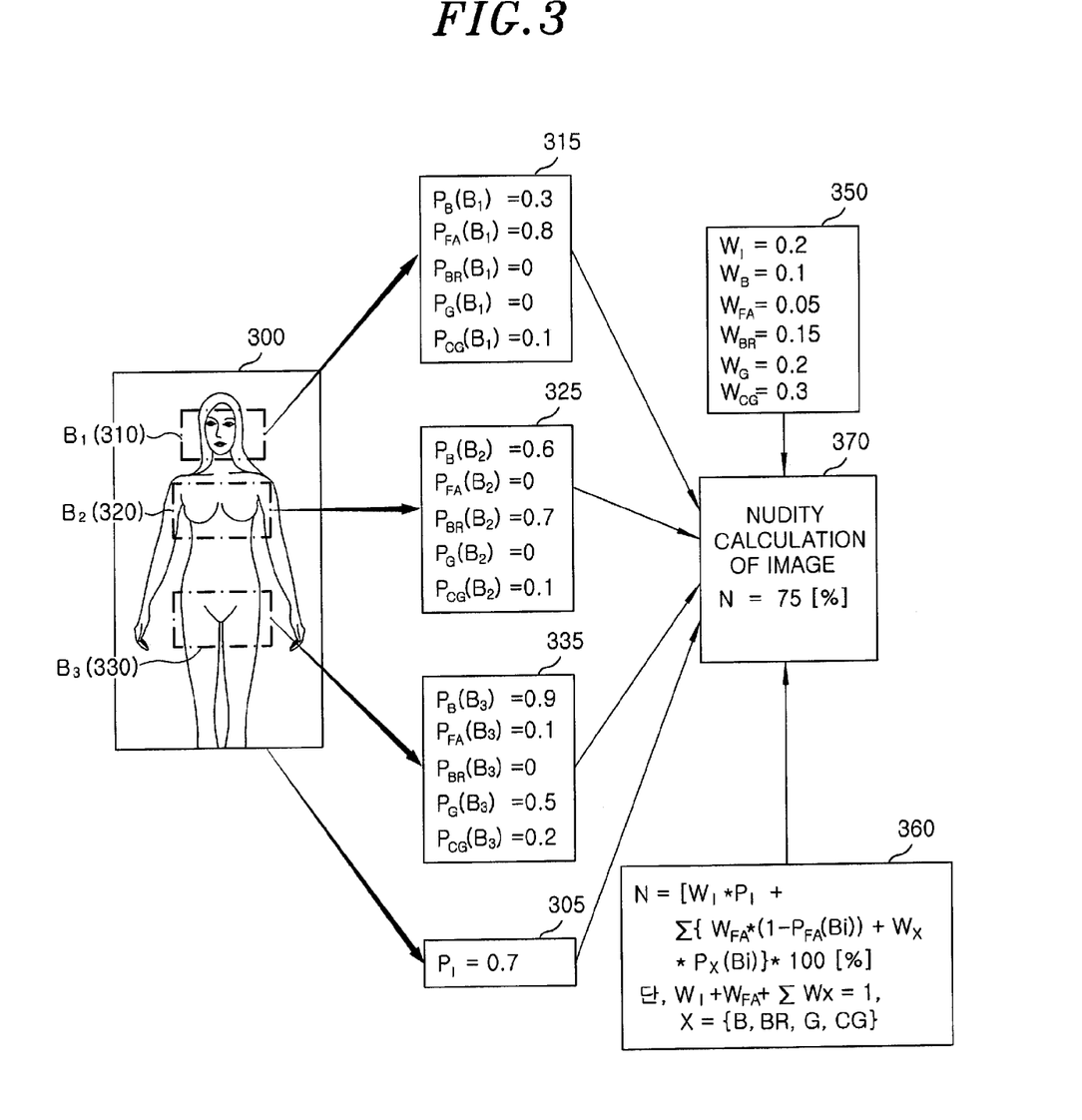
FIG. 3 illustrates a process of applying a nudity analysis method to an actual image in accordance with the embodiment of the present invention.

FIG. 3 illustrates a process of applying a nudity analysis method to an actual image in accordance with the embodiment of the present invention. A nudity analysis of this embodiment is performed by the nudity analysis unit 160, which will be first described below.

The nudity analysis unit 160 analyzes nudity using harmfulness of an image calculated by the harmfulness determination unit 140 and the body part classification result produced by the body part classification unit 150. For the analysis of nudity, the first probability value, which indicates a probability of determination on harmfulness of the image or a skin blob extracted from the image, can be used, along with harmfulness of the image. Further, the second probability value, which indicates a probability of certainty when a classification is made about the skin blob as a specific body part, can be used along with the body part classification result. The first probability value may be divided into a 1a probability value, which is a probability value of determination on harmfulness of the entire image, and a 1b probability value, which is a probability value of determination on harmfulness of the skin blob. Meanwhile, the second probability value may be divided into a face probability value, which indicates a probability of certainty of the skin blob being classified as a face, a breast probability value, which indicates a probability of certainty of the skin blob being classified as breasts, a genitalia probability value which indicates a probability of certainty of the skin blob being classified as genitalia, and a combined genitalia probability value which indicates a probability of certainty of the skin blob being classified as combined genitalia.

Also, a weighted summation of the first probability value and the second probability value can be utilized in the analysis of nudity. The following Equations 1 to 3 are examples of weighted summation for the nudity analysis.

$$N=[W_I*P_I+\Sigma(W_X*P_X(B_i))]*100[\%] \qquad [\text{Equation 1}]$$

where $W_I+\Sigma W_X=1$, $X=\{B, FA, BR, G, CG\}$ $$N=[W_I*P_I+(W_{FA}*(1-P_{FA}(B_i))+W_X*P_X(B_i)]*100[\%] \qquad [\text{Equation 2}]$$

where $W_I+\Sigma W_X=1$, $X=\{B, BR, G, CG\}$ $$N=[W_I*P_I+\Sigma(W_{FA}*(1-P_{FA}(B_i))+W_X*P_X(B_i))]*100[\%] \qquad [\text{Equation 3}]$$

where $W_I+\Sigma W_X=1$, $X=\{B, BR, G\}$ wherein N is nudity of an image, I is the image, B is a skin blob, $P_I$ is a 1a probability value, $W_I$ is a weighting factor of the 1a probability, $P_B(B_i)$ is a 1b probability value, $P_{FA}(B_i)$ is a 2a probability value, $P_{BR}(B_i)$ is a 2b probability value, $P_G(B_i)$ is a 2c probability value, $P_{CG}(B_i)$ is a 2d probability value, and $W_X$ is a weighting factor of the 1b probability value, the 2a probability value, or the 2d probability value.

In Equation 1 to 3, FA represents a face, BR represents breasts, G represents genitalia, CG represents combined genitalia, W represents a weighting factor, and P represents a probability value.

Equation 1 is based on an assumption that a face, breasts, genitalia, and combined genitalia are all used as body parts and the face is a factor of increasing nudity. Equation 2 is based on an assumption that a face, breasts, genitalia, and combined genitalia are all used as body parts but other body parts except the face are factors of increasing nudity. In Equation 2, the face itself is not considered to have an effect on nudity, and if a specific skin blob is detected as a face, a probability value that the skin blob will not be detected as a face is used as a factor of increasing nudity. Equation 3 is based on an assumption that a face, breasts, and genitalia, except combined genitalia, are used as body parts and other body parts than the face are factors of increasing nudity.

Equations employed for nudity analysis using weighted summation are not limited to Equations 1 to 3 but may be modified in various ways depending on which body part affecting nudity is to be chosen and used for nudity analysis, whether or not a face is to be assumed as a body part increasing nudity, whether or not genitalia and combined genitalia are to be considered as different body parts, and so on.

When it is determined that a specific body part is included in an image, nudity N to be rated can be adjusted by adjusting the weighting factors W for ranking nudity N. For instance, in order to exclude a face and breasts included in the image from nudity rating and to give a predetermined value of nudity to genitalia and combined genitalia included in the image, $W_{FA}$ and $W_{BR}$ can be set to 0 and $W_G$ and $W_{CG}$ can be set to 0.5. Nudity can be represented as a percentage of 0% to 100%.

$P_I$, which is a probability value of determination on harmfulness of an entire image, and $P_B(B_i)$, which is a probability value of determination on harmfulness of a skin blob, are calculated by the harmfulness determination unit 140, and $P_{FA}(B_i)$, $P_{BR}(B_i)$, $P_G(B_i)$, and $P_{CG}(B_i)$, which are probability values of certainty of a skin blob being classified as a face, breasts, genitalia, and combined genitalia, respectively, can be calculated by the body part classification unit 150.

Referring again to FIG. 3, the actual process of nudity analysis will be described below.

The image extraction unit 130 extracts skin blobs B1 310, B2 320, and B3 330, from an input image 300.

The harmfulness determination unit 140 calculates, with reference to the harmfulness detection model DB 110, a probability value $P_I$ 305, which is a probability value of determination of harmfulness on the entire image, to obtain $P_I$=0.7. Further, the harmfulness determination unit 140 calculates probability values $P_B(B_1)$, $P_B(B_2)$ and $P_B(B_3)$, which are probability values of determination on harmfulness of the skin blobs B1, B2, and B3, respectively, to obtain $P_B(B_1)$=0.3, $P_B(B_2)$=0.6, and $P_B(B_3)$=0.9. The body part classification unit 150 obtains, with reference to the body part detection model DB 120, calculation results that $[P_{FA}(B_1)$=0.8, $P_{BR}(B_1)$=0, $P_G(B_1)$=0, $P_{CG}(B_1)$=0.1], $[P_{FA}(B_2)$=0, $P_{BR}(B_2)$=0.7, $P_G(B_2)$=0, $P_{CG}(B_1)$=0.1], and $[P_{FA}(B_3)$=0.1, $P_{BR}(B_3)$=0, $P_G(B_3)$=0.5, $P_{CG}(B_3)$=0.2], which are probability values of certainty of a skin blob being classified as a face FA, breasts BR, genitalia G, and combined genitalia CG, respectively. In this embodiment, the weighting factors W 350 are set as follows: $W_I$=0.2, $W_B$=0.1, $W_{FA}$=0.05, $W_{BR}$=0.15, $W_G$=0.2, and $W_{CG}$=0.3.

By this, the nudity analysis unit 160 can substitute the preset weighting factors W 350, the $P_B$ calculated by the harmfulness determination unit 140, and the $P_{FA}$, $P_{BR}$, $P_G$, and $P_{CG}$ calculated by the body part classification unit 150, into Equation 1, thereby rating nudity N=[0.14+0.07+0.245+0.295]*100[%]=69[%].

In case of using Equation 2 as a weighted summation, the nudity analysis unit 160 can substitute the $P_{FA}$, $P_{BR}$, $P_G$, and $P_{CG}$, which are the same probability values of body part classification into Equation 2 based on the similar principle, thereby rating nudity N=[0.14+0.07+0.245+0.295]*100[%]=75[%] as shown in reference number 370.

Figure 4:
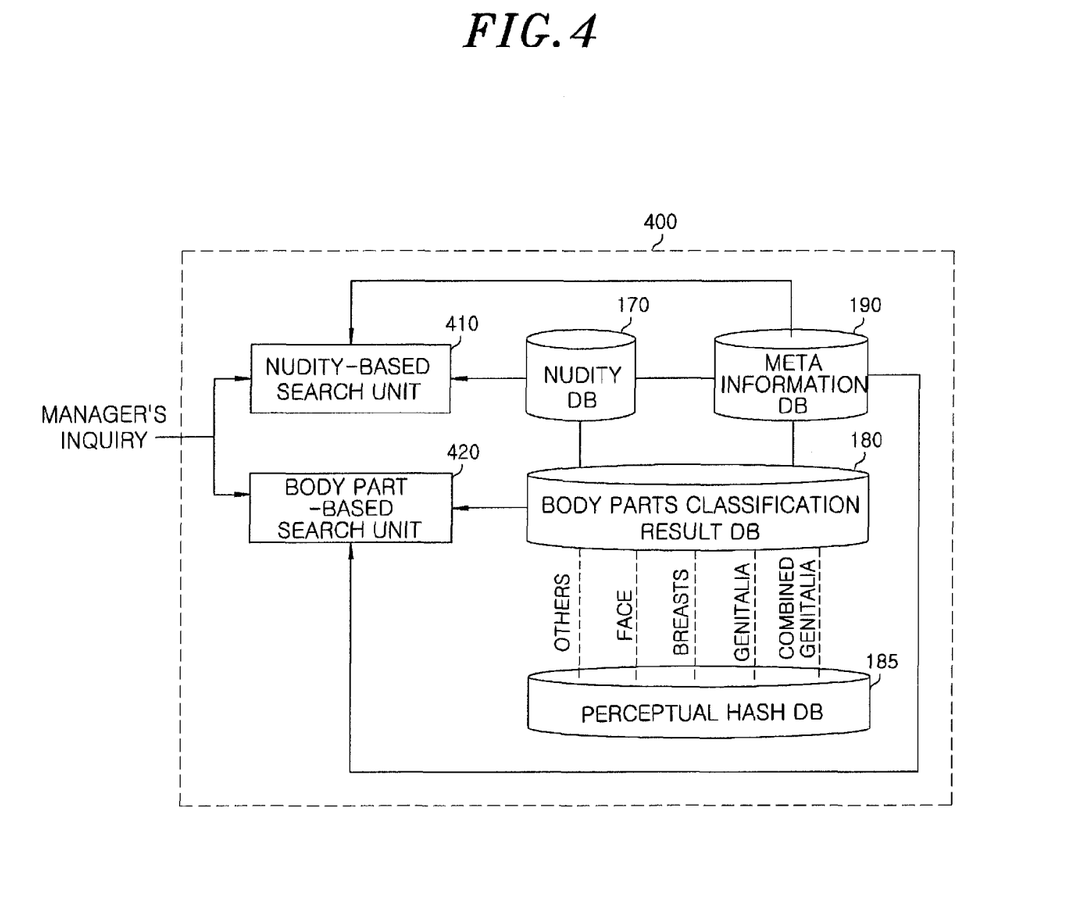
FIG. 4 is a block diagram illustrating a schematic configuration of an apparatus for managing a nudity-based and body part-based image database in accordance with the embodiment of the present invention.

FIG. 4 is a block diagram showing a schematic configuration of an apparatus for managing nudity-based and body part-based image database in accordance with another embodiment of the present invention.

Referring to FIG. 4, the apparatus 400 for managing nudity-based and body part-based image database includes a nudity DB 170, a body part classification result DB 180, a perceptual hash DB 185, a meta information DB 190, a nudity-based search unit 410, and a body part-based search unit 420.

The nudity DB 170, the body part classification result DB 180, the perceptual hash DB 185, and the meta information DB 190 can be established in the same manner as mentioned in the description of the apparatus 100 for analyzing nudity of an image using the body part detection model shown in FIG. 1.

The nudity-based search unit 410 outputs an image, as a response, corresponding to a nudity level input as an inquiry based on the nudity DB 170 and the meta information DB 190. If the meta information DB 190 is searched, meta information on a position and a size of the corresponding image may be output.

The body part-based search unit 420 outputs an image, as a response, corresponding to a body part input as an inquiry based on the body part classification result DB 180. If the perceptual hash DB 185 is constructed together with the body part classification result DB 180, efficiency can be increased in inquiry, management, and search of an image database. At this point, the perceptual hash DB 185 can be configured so as to correspond to the body part classification result DB 185 one-to-one.

Figure 5:
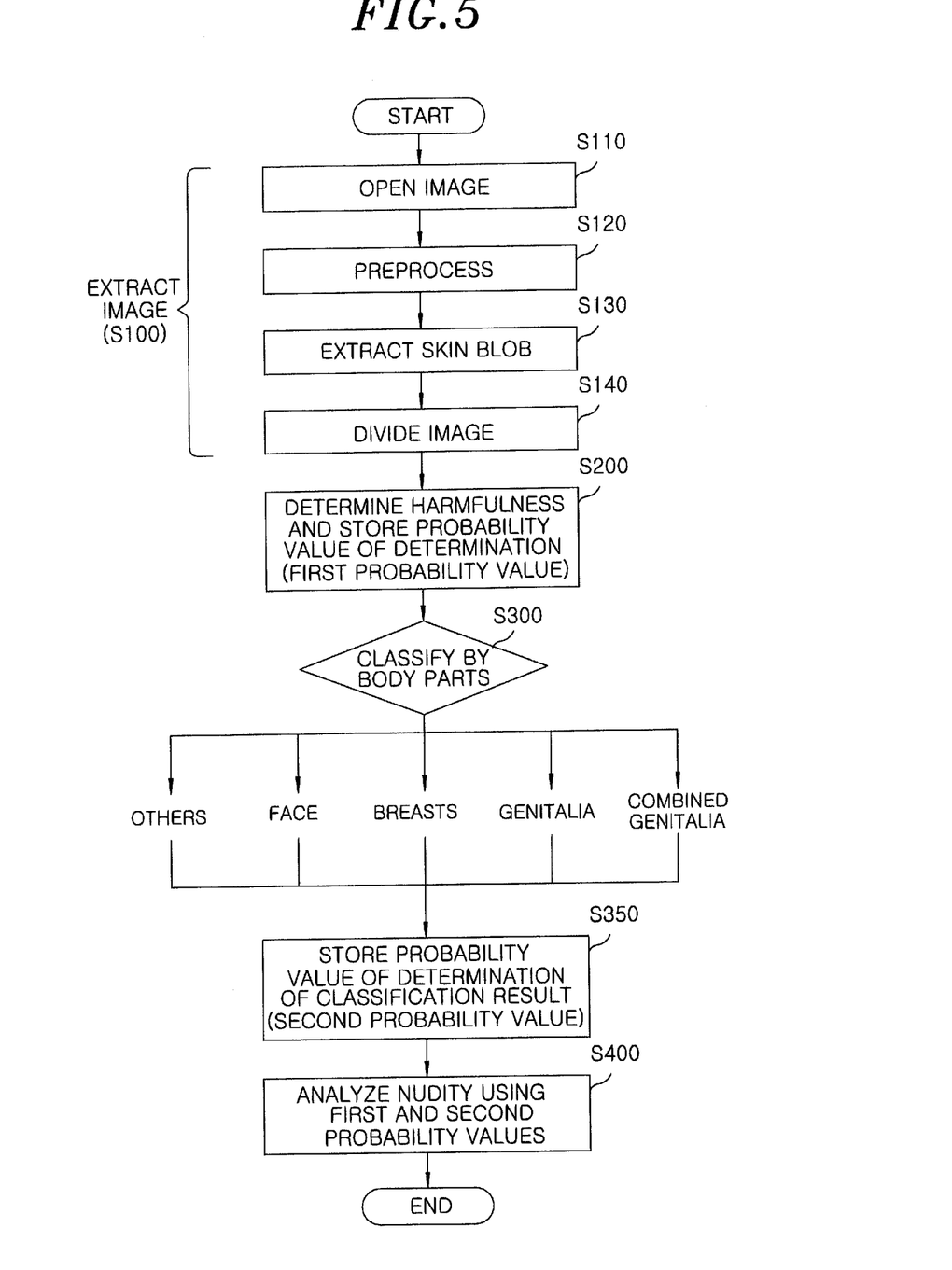
FIG. 5 is a flowchart illustrating a schematic flow of a method for analyzing nudity of an image using a body part detection model in accordance with the embodiment of the present invention.

FIG. 5 is a flowchart illustrating a method for analyzing nudity of an image using a body part detection model in accordance with the embodiment of the present invention.

The method for analyzing nudity of an image using a body part detection model roughly includes an image extraction process S100, a harmfulness determination process S200, a body part classification process S300, and a nudity analysis process S400.

The image extraction process S100 can be subdivided into the steps of opening an input image (S110), performing preprocessing for removing noise and lighting effects in the image (S120), extracting a skin blob from the image by applying a skin color model or a texture energy analysis technique to the image (S130), and dividing an image of the extracted skin blob (S140).

In harmfulness determination process S200, the whole of the image or the skin blob extracted from the image is compared with a harmfulness detection model to determine whether or not the entire image or the skin blob is a harmful image, and a first probability value is stored.

In the body part classification process S300, a skin blob extracted from the image is compared with a body part detection model to classify the skin blob as a specific body part. Next, a second probability value is stored along with a classification result in step S350.

In nudity analysis process S400, nudity is analyzed using harmfulness of the image and the first probability value, that are produced in the harmfulness determination process S200, and the body part classification result and the second probability value, that are produced in the body part classification process S300. For the nudity analysis, harmfulness of the entire image, harmfulness of the skin blob extracted from the image, the body part classification result of the skin blob, predetermined weighting factors for nudity rating, and the like are used. These information may be combined for use in various ways including a weighted summation such as Equations 1 to 3.

Figure 6A:
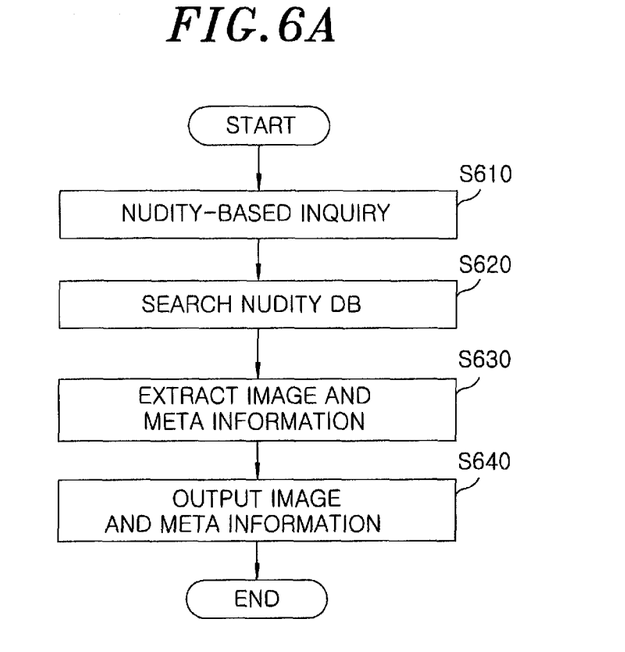
FIG. 6A is a flowchart showing a process of searching an image database in response to a nudity-based inquiry in accordance with the embodiment of the present invention.

FIG. 6A is a flowchart showing a process of searching an image database in response to a nudity-based inquiry. When a manager inputs a nudity-based inquiry in step S610, the nudity-based search unit 410 searches the nudity DB 170 and the meta information DB 190 in step S620, extracts an image corresponding to a nudity level input as the inquiry and its meta information in step S630, and outputs them as a response in step S640.

Figure 6B:
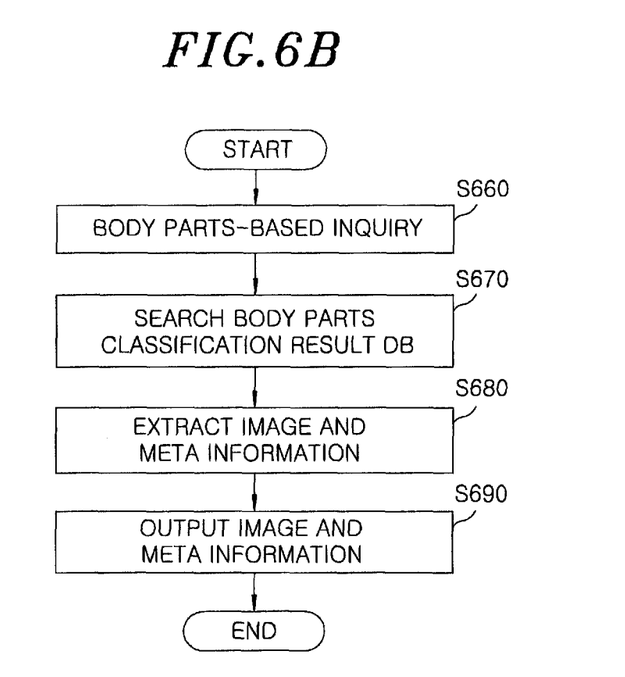
FIG. 6B is a flowchart illustrating a process of searching an image database in response to a body part-based inquiry in accordance with the embodiment of the present invention.

FIG. 6B is a flowchart illustrating a process of searching an image database in response to a body part-based inquiry. When the manager inputs a body part-based inquiry in step S660, the body part-based search unit 420 searches the body part classification result DB 180 in step S670, extracts an image corresponding to a body part input as the inquiry and its meta information in step S680, and outputs them as a response in step S690. If the perceptual hash DB 185 corresponding to the body part classification result DB 180 is configured as well, search and extraction from the perceptual hash DB 185 can be done separately or together with the body part classification result DB 180.

The modules, functional blocks, or means of this embodiment can be implemented in well-known various devices, such as an electronic circuit, an integrated circuit, an application specific integrated circuit (ASIC), etc., and they may be implemented separately or two or more of them may be integrated as a single unit.

In accordance with the present invention, a harmfulness detection model and a body part detection model are used for nudity analysis, thus increasing the reliability of analysis.

Moreover, nudity can be rated based on a classification result of body parts like a face, breasts, combined genitalia, and the like which is a criteria for the SafeNet standards.

Furthermore, nudity-based and body part-based search can be performed on a database containing indecent images.

While the invention has been shown and described with respect to the embodiments, it will be understood by those skilled in the art that various changes and modification may be made without departing from the scope of the invention as defined in the following claims.

What is claimed is:

1. A method for analyzing nudity of an image using a body part detection model, the method comprising:
   extracting a skin blob from an image;
   calculating a first probability value, which indicates a probability of determination on harmfulness of at least one of the image and the skin blob, using a harmfulness detection model;
   classifying the skin blob as a specific body part using a body part detection model, and calculating a second probability value which indicates a probability of certainty of said classifying; and
   rating nudity of the image based on the first probability value and the second probability value,
   wherein the first probability value includes an image probability value, which indicates a probability of determination on harmfulness of the whole of the image, and a skin blob probability value, which indicates a probability of determination on harmfulness of the skin blob.

2. The method of claim 1, wherein the body part detection model includes a face, breasts, genitalia, and combined genitalia as standards of body part classification, and the second probability value includes a face probability value, which indicates a probability of certainty of the skin blob being classified as a face among the standards of body part classification, a breast probability value, which indicates a probability of certainty of the skin blob being classified as breasts, a genitalia probability value, which indicates a probability of certainty of the skin blob being classified as genitalia, and a combined genitalia probability value, which indicates a probability of certainty of the skin blob being classified as combined genitalia.

3. The method of claim 2, wherein the standards of body part classification are SafeNet standards.

4. The method of claim 2, wherein nudity of the image is rated by any one of the following Equations 1 to 3:

$$N=[W_I*P_I+\Sigma(W_X*P_X(B_i))]*100[\%] \qquad \text{[Equation 1]}$$

where $W_I+\Sigma W_X=1$, $X=\{B, FA, BR, G, CG\}$ $$N=[W_I*P_I+\Sigma(W_{FA}*(1-P_{FA}(B_i))+W_X*P_X(B_i))]*100[\%] \qquad \text{[Equation 2]}$$

where $W_I+\Sigma W_X=1$, $X=\{B, BR, G, CG\}$ $$N=[W_I*P_I+\Sigma(W_{FA}*(1-P_{FA}(B_i))+W_X*P_X(B_i))]*100[\%] \qquad \text{[Equation 3]}$$

where $W_I+\Sigma W_X=1$, $X=\{B, BR, G\}$
   wherein N is nudity of the image, I is the image, B is the skin blob, $P_I$ is the image probability value, $W_I$ is a weighting factor of the image probability, $P_B(B_i)$ is the skin blob probability value, $P_{FA}(B_i)$ is the face probability value, $P_{BR}(Bi)$ is the breast probability value, $P_G(B_i)$ is the genitalia probability value, $P_{CG}(B_i)$ is the combined genitalia probability value, and $W_X$ is a weighting factor of the skin blob probability value, the face probability value, or the combined genitalia probability value.

5. The method of claim 1, wherein nudity of the image is rated by weighted summation of the first probability value and the second probability value.

6. The method of claim 1, wherein said extracting the skin blob includes:
   removing noise and lighting effects from the image;
   extracting the skin blob by applying either one or both of a skin color model and a texture energy analysis technique to the image; and
   dividing an image of the extracted skin blob.

7. The method of claim 1, further comprising:
   storing, in a database, a classification result from said classifying the skin blob;
   storing, in a database, meta information including a position or a size of the skin blob within the image; and
   storing a rated nudity of the image in a database.

8. An apparatus for analyzing nudity of an image using a body part detection model, the apparatus comprising:
   a harmfulness detection model database for storing a harmfulness detection model of an image;
   a body part detection model database for storing a body part detection model of the image;
   an extraction unit for extracting a skin blob from the image;
   a harmfulness determination unit for calculating a first probability value, which indicates a probability of determination on harmfulness of at least one of the image and the skin blob, using the harmfulness detection model;
   a body part classification unit for classifying the skin blob as a specific body part by using the body part detection model and calculating a second probability value which indicates a probability of certainty of said classifying; and
   a nudity analysis unit for rating nudity of the image based on the first probability value and the second probability value,
   wherein the first probability value includes an image probability value, which indicates a probability of determination on harmfulness of the whole of the image, and a skin blob probability value, which indicates a probability of determination on harmfulness of the skin blob.

9. The apparatus of claim 8, wherein a classification by body parts performed by the body part classification unit is done based on standards including a face, breasts, genitalia, and combined genitalia, and
   the second probability value includes a face probability value, which indicates a probability of certainty of the skin blob being classified as a face among the standards of body part classification, a breast probability value, which indicates a probability of certainty of the skin blob being classified as breasts, a genitalia probability value, which indicates a probability of certainty of the skin blob being classified as genitalia, and a combined genitalia probability value, which indicates a probability of certainty of the skin blob being classified as combined genitalia.

10. The apparatus of claim 8, wherein the nudity analysis unit rates nudity of the image by weighted summation of the first probability value and the second probability value.

11. The apparatus of claim 8, wherein the extraction unit includes:
    a preprocessor for removing noise and lighting effects from the image;
    a blob extractor for extracting the skin blob by applying either one or both of a skin color model and a texture energy analysis technique to the image; and
    an image divider for dividing an image of the skin blob extracted by the blob extractor.

12. The apparatus of claim 8, further comprising:
    a nudity database for storing a result of classification of the skin blob performed by the body part classification unit;

a meta information database for storing meta information including a position or a size of the skin blob within the image; and a nudity database for storing the nudity of the image rated by the nudity analysis unit.

13. The apparatus of claim 12, further comprising:

a perceptual hash database for configuring and storing the result of classification of the skin blob as a perceptual hash.

\* \* \* \* \*